United States Patent
Koyama et al.

(10) Patent No.: US 9,982,743 B2
(45) Date of Patent: May 29, 2018

(54) VIBRATION-DAMPING ELECTROMAGNETIC ACTUATOR AND MANUFACTURING METHOD THEREOF, ACTIVE FLUID-FILLED VIBRATION-DAMPING DEVICE AND ACTIVE VIBRATION-DAMPING DEVICE USING VIBRATION-DAMPING ELECTROMAGNETIC ACTUATOR

(71) Applicant: SUMITOMO RIKO COMPANY LIMITED, Komaki-shi, Aichi (JP)

(72) Inventors: Hironori Koyama, Komaki (JP); Yushi Hashimoto, Komaki (JP); Masahiko Nagasawa, Komaki (JP); Takayoshi Yasuda, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days. days.

(21) Appl. No.: 15/347,318

(22) Filed: Nov. 9, 2016

(65) Prior Publication Data

US 2017/0058989 A1 Mar. 2, 2017

Related U.S. Application Data (63) Continuation of application No. PCT/JP2015/080950, filed on Nov. 2, 2015.

(30) Foreign Application Priority Data

Nov. 26, 2014 (JP) ................................. 2014-238842

(51) Int. Cl.
*F16F 13/10* (2006.01)
*F16F 13/26* (2006.01)
(Continued)

(52) U.S. Cl.
CPC ............ *F16F 13/10* (2013.01); *B60K 5/1208* (2013.01); *F16F 13/26* (2013.01); *F16F 13/268* (2013.01);
(Continued)

(58) Field of Classification Search
CPC .......... F16C 65/22; F16C 65/28; F16C 51/00; F16C 51/14; F16C 51/24; B60T 1/067
See application file for complete search history.

(56) References Cited

U.S. PATENT DOCUMENTS 6,325,364 B1 * 12/2001 Muramatsu ........... F16F 13/268
267/140.14
6,364,294 B1   4/2002 Gennesseaux et al.
(Continued)

FOREIGN PATENT DOCUMENTS

DE   60007584 T2   11/2004
JP   2001-001765 A   1/2001
(Continued)

OTHER PUBLICATIONS

Dec. 8, 2015 International Search Report issued in International Patent Application No. PCT/JP2015/080950.
(Continued)

*Primary Examiner* — Vishal R Sahni
(74) *Attorney, Agent, or Firm* — Oliff PLC (57) ABSTRACT

A vibration-damping electromagnetic actuator including: a tubular stator; a movable member displaceable relative to the stator in an axial direction, and being inserted in the stator; a housing including a tubular peripheral wall and being attached to the stator; a support rubber elastic body elastically connecting the movable member to the housing; and a coil member and an armature displaceable relative to the coil member disposed at one and the other of the stator and the movable member respectively. The stator is arranged in an inner periphery of the peripheral wall, and a gap is provided between the peripheral wall and the stator in an (Continued)

axis-perpendicular direction. The stator is attached to the housing in a state aligned with the movable member by means of displacement of the stator relative to the housing in the axis-perpendicular direction.

5 Claims, 2 Drawing Sheets

(51) Int. Cl.
*H02K 33/16* (2006.01)
*B60K 5/12* (2006.01)
*H02K 33/02* (2006.01)
*H02K 41/03* (2006.01)
*H02K 5/10* (2006.01)
*H02K 5/22* (2006.01)
*H02K 7/00* (2006.01)

(52) U.S. Cl.
CPC ............... *H02K 5/10* (2013.01); *H02K 5/225* (2013.01); *H02K 7/003* (2013.01); *H02K 33/02* (2013.01); *H02K 33/16* (2013.01); *H02K 41/031* (2013.01)

(56) References Cited

U.S. PATENT DOCUMENTS

| | | | |
|---|---|---|---|
| 6,422,546 B1 | 7/2002 | Nemoto et al. | |
| 7,348,694 B2 | 3/2008 | Tahara et al. | |
| 7,679,228 B2 | 3/2010 | Tahara et al. | |
| 7,923,873 B2 | 4/2011 | Tahara et al. | |
| 2005/0275145 A1* | 12/2005 | Muraoka | F16F 13/268 267/140.14 |
| 2007/0138719 A1* | 6/2007 | Ichikawa | F16F 13/268 267/140.14 |
| 2010/0301530 A1* | 12/2010 | Koyama | F16F 13/268 267/140.14 |
| 2011/0057367 A1* | 3/2011 | Hasegawa | F16F 7/1011 267/140.14 |
| 2012/0200021 A1* | 8/2012 | Kanaya | F16F 13/108 267/140.14 |
| 2012/0242019 A1* | 9/2012 | Koyama | F16F 13/105 267/140.14 |

FOREIGN PATENT DOCUMENTS

| | | |
|---|---|---|
| JP | 3845421 B2 | 11/2006 |
| JP | 2007-170515 A | 7/2007 |
| JP | 2007-252017 A | 9/2007 |
| JP | 4186217 B2 | 11/2008 |
| JP | 2013-060963 A | 4/2013 |

OTHER PUBLICATIONS

Mar. 15, 2018 Office Action issued in German Patent Application No. 11 2015 002 952.4.

* cited by examiner

VIBRATION-DAMPING
ELECTROMAGNETIC ACTUATOR AND
MANUFACTURING METHOD THEREOF,
ACTIVE FLUID-FILLED
VIBRATION-DAMPING DEVICE AND
ACTIVE VIBRATION-DAMPING DEVICE
USING VIBRATION-DAMPING
ELECTROMAGNETIC ACTUATOR

INCORPORATED BY REFERENCE

The disclosure of Japanese Patent Application No. 2014-238842 filed on Nov. 26, 2014 including the specification, drawings and abstract is incorporated herein by reference in its entirety. This is a Continuation of International Application No. PCT/JP2015/080950 filed on Nov. 2, 2015.

BACKGROUND OF THE INVENTION

1. Field of the Invention

The present invention relates to a vibration-damping electromagnetic actuator that generates driving force of a movable member in relation to a stator through energization to a coil, and a method for manufacturing such a device. The present invention also relates to an active fluid-filled vibration-damping device that applies the force generated by the vibration-damping electromagnetic actuator to a fluid chamber in order to reduce vibration in an offset fashion, and an active vibration-damping device that reduces vibration of a member subject to vibration damping in the offset fashion by the force generated by the vibration-damping electromagnetic actuator.

2. Description of the Related Art

From the past, for an active fluid-filled vibration-damping device, an active vibration-damping device or the like, a vibration-damping electromagnetic actuator has been used as an actuator that generates oscillation force. The vibration-damping electromagnetic actuator includes a tubular stator housed within a housing and a movable member inserted into the stator displaceably relative to the stator. For those stator and movable member, one has a coil member including a coil that forms a magnetic field through energization, while the other has an armature that is displaced relative to the coil member due to the force generated by an effect of the magnetic field formed by the coil. Note that a vibration-damping electromagnetic actuator shown in U.S. Pat. No. 7,348,694 has a structure wherein a tubular stator provided with a coil member is externally disposed about a movable member provided with an armature.

As for U.S. Pat. No. 7,348,694, an outer yoke attached to a coil is attached fitting in contact with a peripheral wall of a housing in the axis-perpendicular direction, so that the position of the stator in the axis-perpendicular direction is set by the housing. Meanwhile, the movable member is elastically positioned with respect to the housing in the axis-perpendicular direction by a support rubber elastic body. Thus, by the stator and the movable member each being aligned with the housing in the axis-perpendicular direction with high accuracy, the stator and the movable member are relatively aligned with each other in the axis-perpendicular direction.

However, in fact, deviation of the relative position of the stator and the movable member is hard to be avoided, due to component dimensional errors, contraction of the support rubber elastic body after molding, or the like. This may cause the problems of variability in the output characteristics, abrasion due to forced contact between the stator side and the movable member side in part of the circumference, and further, strain of the support rubber elastic body, or the like.

SUMMARY OF THE INVENTION

The present invention has been developed in view of the above-described matters as the background, and it is an object of the present invention to provide a vibration-damping electromagnetic actuator with a novel structure which is able to stably obtain a desired output while realizing stabilization of the operation, improvement of the durability, or the like through a simple structure, and to provide a method for manufacturing such a device.

Moreover, it is another object of the present invention to provide an active fluid-filled vibration-damping device and an active vibration-damping device with a novel structure including the vibration-damping electromagnetic actuator that exhibits the above-described effect.

The above and/or optional objects of this invention may be attained according to at least one of the following modes of the invention. The following modes and/or elements employed in each mode of the invention may be adopted at any possible optional combinations.

Specifically, a first mode of the present invention provides a vibration-damping electromagnetic actuator comprising: a tubular stator; a movable member displaceable relative to the stator in an axial direction, and being inserted in the stator; a housing including a tubular peripheral wall and being attached to the stator; a support rubber elastic body elastically connecting the movable member to the housing; a coil member with a coil generating a magnetic field through energization, which is disposed at one of the stator and the movable member; and an armature displaceable relative to the coil member by an effect of the magnetic field generated by the coil, which is disposed at an other one of the stator and the movable member, wherein the stator is arranged in an inner periphery of the peripheral wall, a gap is provided between the peripheral wall and the stator in an axis-perpendicular direction, and the stator is attached to the housing in a state aligned with the movable member by means of displacement of the stator relative to the housing in the axis-perpendicular direction.

With the vibration-damping electromagnetic actuator constructed according to the first mode of the present invention, by providing a gap between the stator and the peripheral wall of the housing, relative displacement between the stator and the peripheral wall in the axis-perpendicular direction is permitted. With this arrangement, by adjusting the position of the stator relative to the housing so as to be aligned with the position of the movable member that has been elastically positioned with respect to the housing by the support rubber elastic body, the stator arranged in the inner periphery of the peripheral wall can be aligned with the movable member. As a result, with the movable member inserted in the stator, it is possible to reduce strain to be input to the support rubber elastic body, while avoiding increase in abrasion of the stator and the movable member caused by being pressed against each other in the axis-perpendicular direction, operation failure due to sticking, or the like.

A second mode of the present invention provides the vibration-damping electromagnetic actuator according to the first mode, wherein the stator aligned with the movable member in the axis-perpendicular direction is fixed to the housing non-displaceably relative to the housing in the axis-perpendicular direction.

According to the second mode, by fixing the stator aligned with the movable member to the housing, the stator and the movable member will be retained in a state relatively positioned in the axis-perpendicular direction. Besides, noises etc. caused by movement of the stator with respect to the housing will be avoided.

A third mode of the present invention provides the vibration-damping electromagnetic actuator according to the second mode, wherein the housing has a bottomed cup shape with a bottom wall, a support member is secured to the support rubber elastic body, the support member is fixed to the housing, and the stator aligned with the movable member in the axis-perpendicular direction is clasped between the bottom wall of the housing and the support member in the axial direction so as to be fixed to the housing non-displaceably relative to the housing in the axis-perpendicular direction.

According to the third mode, by clasping the stator between the bottom wall of the housing and the support member in the axial direction, even with the structure wherein the gap is provided between the stator and the peripheral wall of the housing opposed in the axis-perpendicular direction, the stator can be readily positioned and fixed with respect to the housing.

A fourth mode of the present invention provides the vibration-damping electromagnetic actuator according to any one of the first through third modes, wherein an output member secured to the support rubber elastic body is inserted in the movable member, and a position adjustment member is provided so as to enable adjustment of an axial position of the movable member with respect to the output member.

According to the fourth mode, the stator and the movable member can be aligned with each other not only in the axis-perpendicular direction but also in the axial direction. This makes it possible to prevent variability in the output characteristics due to errors in the relative position of the stator and the movable member, thereby stably obtaining the desired output.

A fifth mode of the present invention provides a manufacturing method of the vibration-damping electromagnetic actuator according to any one of the first through fourth modes, comprising: an alignment step of arranging the stator in the inner periphery of the peripheral wall of the housing and aligning the stator with the movable member in the axis-perpendicular direction; and a fixing step of fixing the stator aligned with the movable member in the axis-perpendicular direction to the housing non-displaceably relative to the housing in the axis-perpendicular direction.

According to the fifth mode, the stator, which is arranged in the inner periphery of the peripheral wall of the housing, is aligned with the movable member in the axis-perpendicular direction, and then the stator is fixed to the housing. By so doing, the stator can be retained in the state aligned with the movable member, and displacement of the stator relative to the housing will be prevented. This will avoid occurrence of noises or the like.

A sixth mode of the present invention provides an active fluid-filled vibration-damping device comprising: a first mounting member; a second mounting member; a main rubber elastic body elastically connecting the first mounting member and the second mounting member to each other; a fluid chamber whose wall is partially constituted by the main rubber elastic body with a non-compressible fluid sealed therein; an oscillation member constituting another part of the wall of the fluid chamber; and the vibration-damping electromagnetic actuator according to any one of the first through fourth modes being attached to the oscillation member via the movable member of the vibration-damping electromagnetic actuator so that oscillation force generated by the vibration-damping electromagnetic actuator is applied to the fluid chamber through the oscillation member.

According to the sixth mode, by the stator and the movable member of the vibration-damping electromagnetic actuator being aligned with each other, it is possible to stably obtain the oscillation force to be applied to the fluid chamber. Besides, since the abrasion due to sliding contact of the stator and the movable member is minimized, an excellent durability will be realized.

A seventh mode of the present invention provides an active vibration-damping device comprising the vibration-damping electromagnetic actuator according to any one of the first through fourth modes, wherein the housing is configured to be attached to a member subject to vibration damping, and the stator and the movable member are elastically connected to each other by the support rubber elastic body.

According to the seventh mode, by the stator and the movable member of the vibration-damping electromagnetic actuator being aligned with each other, it is possible to stably obtain the oscillation force to be applied to the member subject to vibration damping. Besides, since the abrasion due to sliding contact of the stator and the movable member is minimized, an excellent durability will be realized.

According to the present invention, the gap is provided between the stator and the peripheral wall of the housing. Thus, the stator is attached to the housing in the state aligned with the movable member by means of displacement of the stator relative to the housing in the axis-perpendicular direction. This makes it possible to adjust the position of the stator relative to the housing so as to be aligned with the position of the movable member that has been elastically positioned with respect to the housing by the support rubber elastic body. Accordingly, with the movable member inserted in the stator, it is possible to reduce strain to be input to the support rubber elastic body, while avoiding increase in abrasion of the stator and the movable member caused by being pressed against each other in the axis-perpendicular direction, operation failure due to sticking, or the like.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

An embodiment of the present invention will be described below in reference to the drawings.

Figure 1:
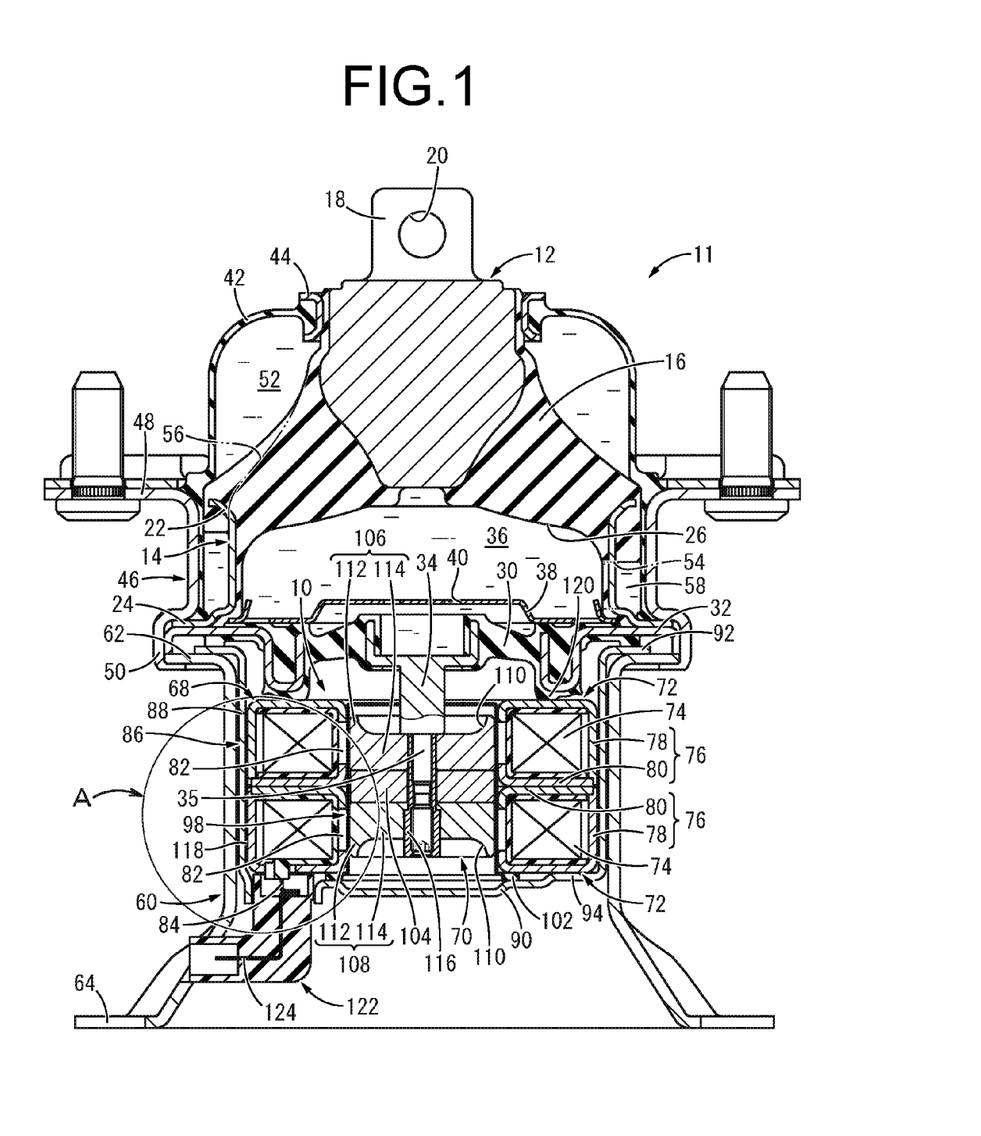
FIG. 1 is a longitudinal cross sectional view showing an active fluid-filled vibration-damping device in the form of an engine mount as a first embodiment of the present invention.

As a first embodiment of the present invention, FIG. 1 shows an engine mount 11 as an active fluid-filled vibration-damping device provided with a vibration-damping electromagnetic actuator 10 according to this invention. The engine mount 11 includes a first mounting member 12, a second mounting member 14, and a main rubber elastic body 16 connecting them to one another elastically. The descriptions hereafter presupposes that the up-down direction is the up-down direction in FIG. 1, i.e., the direction of displacement of a movable member 70 relative to a stator 68 described later, unless otherwise explained.

In more detail, the first mounting member 12 is a member with high rigidity formed of a metal, a synthetic resin, or another material, in a shape of a block extending in the up-down direction with a roughly circular cross sectional shape. The first mounting member 12 integrally includes an attachment piece 18 with a plate shape projecting above, which has a bolt hole 20 formed therethrough.

The second mounting member 14 is a member with high rigidity like the first mounting member 12, which extends in the peripheral direction with a longitudinal cross section of a concave shape opening toward the outer periphery. The whole second mounting member 14 takes the substantial form of a thin-walled, large-diameter circular tube. The upper end of the second mounting member 14 is a tapered part 22 that expands toward the upper side, while the lower end thereof is a caulking plate 24 in a shape of an annular plate.

The first mounting member 12 is disposed above the second mounting member 14, and the main rubber elastic body 16 is disposed between those first mounting member 12 and second mounting member 14. The main rubber elastic body 16 has a substantial shape of a thick-walled, truncated cone. The small-diameter side end portion of the main rubber elastic body 16 is bonded by vulcanization to the first mounting member 12, while the large-diameter side end portion of the main rubber elastic body 16 is bonded by vulcanization to the second mounting member 14. The main rubber elastic body 16 of this embodiment takes the form of an integrally vulcanization molded component incorporating the first mounting member 12 and the second mounting member 14.

This main rubber elastic body 16 has a large-diameter recess 26. The large-diameter recess 26 is a recess with a circular transverse cross section that opens on the axial end surface on the large-diameter side of the main rubber elastic body 16, and its upper base wall surface has a tapered shape whose diameter becoming smaller upward. The diameter of the large-diameter recess 26 is smaller than the inside diameter of the second mounting member 14, whereby the inner peripheral surface of the second mounting member 14 is covered with a rubber layer in a rough shape of a circular tube formed integrally with the main rubber elastic body 16. Moreover, the upper end of the second mounting member 14 including the tapered part 22 is covered with the main rubber elastic body 16 up to the outer peripheral side, so that it is bonded to the main rubber elastic body 16 as buried therein.

To this integrally vulcanization molded component of the main rubber elastic body 16, a support rubber elastic body 30 is attached. The support rubber elastic body 30 has an approximate shape of an annular plate, wherein an annular support member 32 of metal is bonded by vulcanization to its outer peripheral end part. In the support member 32, the inner peripheral part in a groove shape is bonded to the outer peripheral end part of the support rubber elastic body 30, while the outer peripheral part approximately in an annular plate shape is overlapped with the caulking plate 24 of the second mounting member 14 from below. Also, to the inner peripheral end part of the support rubber elastic body 30, an output member 34 as an oscillation member is bonded by vulcanization, thereby closing off the central hole of the support rubber elastic body 30. The output member 34 includes an upper part of roughly bowl shape and a lower part of rod shape extending axially downward from the upper part. Besides, at the lower end part of the output member 34, a male thread portion 35 with a screw thread formed on its outer peripheral surface is provided.

The support rubber elastic body 30 incorporating the support member 32 and the output member 34 is attached to the integrally vulcanization molded component of the main rubber elastic body 16, whereby the large-diameter recess 26 of the main rubber elastic body 16 is covered by the support rubber elastic body 30 in a fluidtight manner. Thus, these main rubber elastic body 16, support rubber elastic body 30, and output member 34 define a primary liquid chamber 36 as a fluid chamber using the large-diameter recess 26. For the primary liquid chamber 36, a part of the wall thereof is constituted by the main rubber elastic body 16, while another part of the wall thereof is constituted by the support rubber elastic body 30 and the output member 34, and a non-compressible fluid is sealed therein. The non-compressible fluid sealed in the primary liquid chamber 36 is not limited to a particular fluid. For example, preferably adopted as the fluid is a liquid such as water, ethylene glycol, alkylene glycol, polyalkylene glycol, silicone oil, or a mixture liquid of them. Moreover, a low-viscosity fluid having viscosity of 0.1 Pa·s or lower is desirable, for advantageously obtaining vibration-damping effect based on fluid flowing action described later.

In the present embodiment, a partition fitting 38 is disposed between the support rubber elastic body 30 and the main rubber elastic body 16. The partition fitting 38 has a substantial shape of a thin circular plate, wherein the outer peripheral part is superposed to the upper surface of the support member 32 via the rubber elastic body, while the inner peripheral part is positioned higher than the outer peripheral part and is remote upward from the support rubber elastic body 30 and the output member 34. The partition fitting 38 has also a plurality of filter orifices 40 that are small-diameter circular holes formed in the inner peripheral part penetrating therethrough in the thickness direction.

Also, to the integrally vulcanization molded component of the main rubber elastic body 16, a flexible film 42 is fixed. The flexible film 42, which is a thin rubber film being readily subject to flexural deformation, takes the substantial form of a ring extending continuously in the peripheral direction as a whole, with its longitudinal cross sectional shape being convex toward the outer periphery. The flexible film 42 is bonded by vulcanization to an inner mating fitting 44 at its upper end part (the inner peripheral end part) thereof, and to an outer caulking fitting 46 at its lower end part (the outer peripheral end part).

The inner mating fitting 44 is an annular metal fitting that extends continuously across the entire periphery with a cross sectional shape of a groove opening toward the outer periphery. The upper end part of the flexible film 42 is bonded by vulcanization on the outer peripheral surface of the inner mating fitting 44. The inner mating fitting 44 is fitted externally onto the first mounting member 12, so that the upper end part of the flexible film 42 is attached to the first mounting member 12.

The outer caulking fitting 46 takes the substantial form of a large-diameter circular tube as a whole, and the flexible film 42 is bonded by vulcanization on the inner peripheral surface thereof. The upper end part of the outer caulking fitting 46 integrally includes a flange 48 that expands to the outer peripheral side. The lower end part of the outer caulking fitting 46 has a step and a caulking piece 50 that projects downward from the outer peripheral end of the step. The caulking piece 50 of the outer caulking fitting 46 is caulked to the caulking plate 24 of the second mounting member 14, whereby the lower end part of the flexible film 42 is fixed to the second mounting member 14. The upper end of the second mounting member 14 is abutted against the outer caulking fitting 46 in the axis-perpendicular direction via the rubber elastic bodies. This seals a gap between the upper end of the second mounting member 14 and the outer caulking fitting 46 in a fluidtight manner. In addition, the outer peripheral part of the support member 32 that is bonded to the support rubber elastic body 30 is fastened together with the caulking plate 24 of the second mounting member 14 by caulking the caulking piece 50 of the outer caulking fitting 46, thereby being fixed to the second mounting member 14.

Thus, the upper end part of the flexible film 42 is attached to the first mounting member 12, while the lower end part of the flexible film 42 is attached to the second mounting member 14. Consequently, the flexible film 42 is disposed on the outer peripheral side of the main rubber elastic body 16. The flexible film 42 defines an auxiliary liquid chamber 52 together with the main rubber elastic body 16 and divides the chamber from the outside fluidtightly. The auxiliary liquid chamber 52, which can change its volume easily with its wall being partially constituted by the flexible film 42, is filled with the same non-compressible fluid as that of the primary liquid chamber 36.

The engine mount 11 further includes a tunnel-shaped passage extending peripherally continuously between the axially medial section surfaces of the second mounting member 14 and the outer caulking fitting 46, which are opposite in the axis-perpendicular direction. The tunnel-shaped passage communicates with the primary liquid chamber 36 through a first communication passage 54 formed at a part on the periphery. This passage communicates with the auxiliary liquid chamber 52 through a second communication passage 56 formed at another part on the periphery, thereby providing an orifice passage 58, which communicates the primary liquid chamber 36 and the auxiliary liquid chamber 52 with one another, between the second mounting member 14 and the outer caulking fitting 46. The tuning frequency of the orifice passage 58 that is the resonance frequency of the flowing fluid is set as appropriate, by adjusting the ratio (A/L) of the passage cross sectional area (A) to the passage length (L) using the wall spring rigidity for the primary liquid chamber 36 and the auxiliary liquid chamber 52. In the present embodiment, the tuning frequency is tuned to about 10 Hz corresponding to engine shake. Note that a not-shown partition wall, which is formed integrally with the main rubber elastic body 16, is fixed on the outer peripheral surface of the second mounting member 14. The length of the tunnel-shaped passage is accordingly shorter than one periphery in the peripheral direction, and the communication passages 54, 56 are each formed at the respective peripheral end of the tunnel-shaped passage.

Moreover, to the outer caulking fitting 46, a fastening fitting 60 is fixed. The fastening fitting 60 is, as a whole, in a substantial shape of a large-diameter circular tube, wherein the upper end part thereof is provided with a flange-shaped connection plate 62, while the lower end part thereof is provided with a flange-shaped attachment plate 64. The connection plate 62 is caulked with the caulking piece 50 of the outer caulking fitting 46 in order to connect the fastening fitting 60 to the outer caulking fitting 46. Thus, these outer caulking fitting 46 and fastening fitting 60 constitute the outer bracket. The connection plate 62 of the fastening fitting 60 is caulked together with the caulking plate 24 of the second mounting member 14 and the outer peripheral part of the support member 32, using the caulking piece 50. Consequently, the fastening fitting 60 is fixed to the second mounting member 14 and the support member 32.

For the engine mount 11 of the present embodiment, the portion filled with the fluid is manufactured, for example, in the following way. Specifically, first, the integrally vulcanization molded component of the main rubber elastic body 16 and the integrally vulcanization molded component of the flexible film 42 are assembled within the fluid to be sealed or in the atmosphere. At that time, the air remaining in the orifice passage 58 or auxiliary liquid chamber 52 can be eliminated by using jet stream within the non-compressible fluid, for example.

Next, the integrally vulcanization molded component of the support rubber elastic body 30 is attached to the assembly. For example, by press-fitting the support member 32 into the caulking piece 50 of the outer caulking fitting 46 within the non-compressible fluid to be sealed, it is possible to fill the non-compressible fluid and temporarily seal it, by utilizing the sealing rubber fixed to the second mounting member 14, outer caulking fitting 46 or the like to obtain fluidtightness. By so doing, it is also possible to take out the assembly in which the non-compressible fluid is filled from the fluid and attach the vibration-damping electromagnetic actuator 10 thereto in the atmosphere. Of course, it may also be acceptable to seal and fill the non-compressible fluid into the primary liquid chamber 36 and the auxiliary liquid chamber 52 by assembling the components in the atmosphere and then injecting the fluid to be sealed through a through hole provided to the first mounting member 12 to seal the through hole.

On the inner peripheral side of the fastening fitting 60, the vibration-damping electromagnetic actuator 10 is disposed. The vibration-damping electromagnetic actuator 10 has a structure in which the movable member 70 is placed by being inserted into the stator 68 in a displaceable manner relative thereto in the axial direction.

Figure 2:
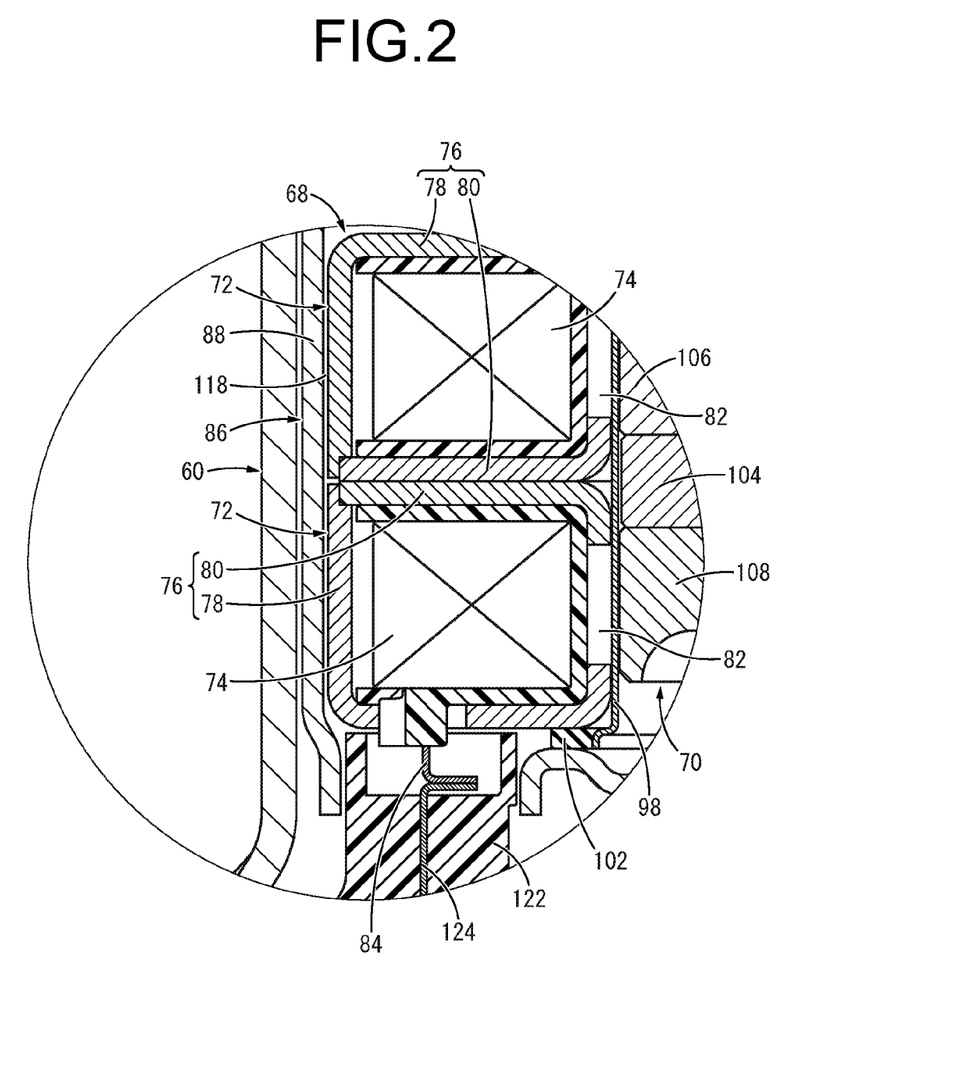
FIG. 2 is a fragmentary enlarged view of a principal part of the engine mount shown in FIG. 1, showing Part A of FIG. 1 as enlarged.

The stator 68 has two coil members 72, 72 that are arranged one above the other. The coil member 72 includes a coil 74 that is constituted by a bobbin formed of a resin wound by a metal wire and an outer yoke 76 is attached to the coil 74. The coil member 72, as a whole, takes the substantial form of a large-diameter circular tube. The outer yoke 76, which is formed of a ferromagnetic material like iron, includes a first yoke 78 to be overlapped with the axial outer surface of the coil 74 and a second yoke 80 to be overlapped with the axial inner surface of the coil 74. More specifically, the first yoke 78 is attached as covering the axial outer surface, the outer peripheral surface, and the axial outer edge portion of the inner peripheral surface in the coil 74. Meanwhile, the second yoke 80 is attached as covering the axial inner surface and the axial inner edge portion of the inner peripheral surface in the coil 74. Owing to this, the outer yoke 76 forms a magnetic path guiding a magnetic flux generated by energization to the coil 74 around the coil 74. Meanwhile, the first yoke 78 and the second yoke 80 are remote in the up-down direction on the inner peripheral side of the coil 74, thereby forming a magnetic gap 82.

Owing to power feed to the coils 74, 74, the magnetic flux is generated around the coils 74, 74 and guided by the magnetic path constituted by the outer yokes 76, 76. Accordingly, the outer yoke 76 has a magnetic pole formed at the formation section of the magnetic gap 82. The coil 74 of the coil member 72 on the upper side and the coil 74 of the coil member 72 on the lower side are formed with a continuous wire which is wound around the bobbins in the adverse directions relative to each other, thereby generating magnetic fluxes in the adverse directions owing to energization. Also, the upper and lower coil members 72, 72 are substantially symmetrical to one another in structure, except that the lower coil member 72 is provided with a coil terminal fitting 84 projecting downward, which is electrically connected to the coil 74.

The stator 68 is housed within a case member 86 serving as a housing. The case member 86, roughly in a bottomed cup shape as a whole, is provided integrally with a peripheral wall 88 in a rough shape of a circular tube, a bottom wall 90 in a rough shape of a circular disk, and a flange-shaped support piece 92 formed at its opening. The stator 68 is arranged in the inner periphery of the peripheral wall 88 as well as above the bottom wall 90 of the case member 86. In the present embodiment, the bottom wall 90 of the case member 86 has a shape of a stepped plate which is positioned gradually higher toward the outer periphery, whose outer peripheral edge portion is a stator support part 94 with an annular plate shape that is abutted against the stator 68.

In the center hole of the stator 68, a guide sleeve 98 is inserted and disposed. The guide sleeve 98 is a member having a roughly thin-walled circular tube shape formed of a nonmagnetic stainless steel etc. The surface of the guide sleeve 98 is preferably subjected to low friction surface treatment like fluororesin coating. Moreover, the lower end portion of the guide sleeve 98 is provided with a fixation part having a large-diameter tubular shape, to which an elastic support body 102 is fixed so as to project toward the outer periphery. By the elastic support body 102 being clasped in the axial direction between the coil member 72 and the bottom wall 90 of the case member 86, the guide sleeve 98 is elastically supported by the stator 68.

In the guide sleeve 98 arranged in the center hole of the stator 68, the movable member 70 is inserted. The movable member 70 has an armature including a permanent magnet 104, and an upper yoke 106 and a lower yoke 108 that overlap the upper and lower sides of a permanent magnet 104, respectively. The permanent magnet 104, which has a substantial shape of an annular plate, is magnetized in the axial direction, thereby having the respective one of two magnetic poles formed on each of the upper and lower surfaces. Note that, as the permanent magnet 104, although a ferrite based magnet or an alnico based magnet etc. can be adopted, preferably adopted is a rare-earth cobalt based magnet such as a samarium-cobalt magnet, which can have great coercive force despite its smallness and lightness.

The upper yoke 106 is formed of a ferromagnetic material like iron to which low friction surface treatment including fluororesin coating is applied. The upper yoke 106 has a substantial shape of an annular plate as a whole. For the upper yoke 106, the lower surface is a plane surface expanding in the axis-perpendicular direction, while the upper surface has a lightening part 110 in a recessed shape at its inner peripheral part. Thus, in the upper yoke 106, the outer peripheral part is a thick-walled part 112 that is large in the axial dimension, while the inner peripheral part is a thin-walled part 114 that is smaller in the axial dimension than the thick-walled part 112. The lower yoke 108 has a structure of the upper yoke 106 turned upside down. For this reason, the explanation thereabout is omitted by giving the same code numbers in the drawings.

The upper yoke 106 overlaps the upper surface of the permanent magnet 104, while the lower yoke 108 overlaps the lower surface of the permanent magnet 104. These permanent magnet 104 and upper and lower yokes 106, 108 are connected to one another by a position adjustment nut 116 being press-fitted into the center hole. Consequently, the upper and lower yokes 106, 108 are magnetized by the magnetic field of the permanent magnet 104, thereby providing the opposite magnetic poles on the outer peripheral surface of the upper yoke 106 and the outer peripheral surface of the lower yoke 108, respectively. The position adjustment nut 116 has a substantial shape of a small-diameter circular tube, with a screw thread on the inner peripheral surface. Such a position adjustment nut 116 has a larger diameter in the axially lower section than in the upper section. The lower section of the position adjustment nut 116 with the larger diameter axially touches a step formed on the inner peripheral surface of the lower yoke 108. This axially positions the position adjustment nut 116 in relation to the permanent magnet 104 and the upper and lower yokes 106, 108.

The output member 34 is inserted into the movable member 70, so that the movable member 70 is attached to the output member 34. Specifically, the movable member 70 is fixed in a predetermined axial position relative to the output member 34, by threading the male thread portion 35 provided at the lower end part of the output member 34 onto the position adjustment nut 116, while threading a locking bolt into the position adjustment nut 116 from below. Moreover, by fixing the case member 86 to the second mounting member 14 described later, the support member 32 bonded to the support rubber elastic body 30 is fixed to the case member 86, so that the movable member 70 is elastically connected to the case member 86 by the support rubber elastic body 30. Therefore, the movable member 70 attached to the output member 34 is elastically positioned with respect to the case member 86 by the support rubber elastic body 30.

About this movable member 70, the stator 68 in a tubular shape is externally disposed so that the movable member 70 is arranged in a displaceable manner relative to the stator 68 in the axial direction. Suitable adjustment in the screwing amount of the position adjustment nut 116 provided to the movable member 70 relative to the male thread portion 35 enables adjustment in the axial position of the movable member 70 relative to the output member 34, thereby constituting a position adjustment member. Accordingly, variable axial position of the output member 34 would not affect the aligning of the movable member 70 in a predetermined axial position with the stator 68. The movable member 70 is axially positioned in relation to the stator 68 so that the axial center of the thick-walled part 112 of the upper yoke 106 is aligned with the axial center of the magnetic gap 82 of the upper coil member 72, while the axial center of the thick-walled part 112 of the lower yoke 108 is aligned with the axial center of the magnetic gap 82 of the lower coil member 72.

Here, a gap 118 is provided between opposed faces of the stator 68 and the peripheral wall 88 of the case member 86 in the axis-perpendicular direction. Specifically, the outside diameter dimension of the coil members 72, 72 that constitute the stator 68 is made smaller than the inside dimension of the peripheral wall 88 of the case member 86 so that the outer peripheral surfaces of the coil members 72, 72 are situated in opposition to the inner peripheral surface of the peripheral wall 88 so as to be remote therefrom to the inner peripheral side, thereby providing the gap 118. By so doing, the stator 68 is displaceable relative to the case member 86 in the axis-perpendicular direction, and is aligned with the movable member 70, which is elastically positioned with respect to the case member 86, in the axis-perpendicular direction by means of displacement of the stator 68 relative to the case member 86 in the axis-perpendicular direction.

Besides, with the stator 68 relatively aligned with the movable member 70, the stator 68 is clasped between the inner peripheral part of the support member 32 and the stator support part 94 of the bottom wall 90 of the case member 86 in the axial direction, whereby the stator 68 is fixed in position to the case member 86 non-displaceably relative to the case member 86. In the present embodiment, the lower surface of the inner peripheral part of the support member 32 in a groove shape is covered with a clasped rubber 120, which is formed integrally with the support rubber elastic body 30. Accordingly, the first yoke 78 of the upper coil member 72 abuts indirectly to the support member 32 via the clasped rubber 120, thereby avoiding noises or damages to the outer yoke 76 and the support member 32 due to their direct contact.

It should be appreciated that the vibration-damping electromagnetic actuator 10 can be obtained by the manufacturing method including an alignment step and a fixing step as follows, for example. Specifically, first, the coil members 72, 72 that constitute the stator 68 and the guide sleeve 98 are disposed externally about the movable member 70, then, the position adjustment nut 116 of the movable member 70 is threaded onto the male thread portion 35 of the output member 34. Next, the stator 68 is housed in the case member 86 and is displaced relative to the case member 86 in the axis-perpendicular direction. This completes the alignment step of aligning the stator 68 with the movable member 70 in the axis-perpendicular direction. Subsequently, the support piece 92 of the case member 86 is fixed together with the support member 32 to the outer caulking fitting 46 by caulking, and the stator 68 aligned with the movable member 70 is clasped between the bottom wall 90 of the case member 86 and the support member 32 in the axial direction. This completes the fixing step of fixing the stator 68 to the case member 86 non-displaceably relative to the case member 86. Through the above-described steps, the vibration-damping electromagnetic actuator 10 according to the present embodiment can be obtained.

In addition, the coil terminal fitting 84 provided to the stator 68 is connected to a connector 122 attached to the case member 86. The connector 122 is mounted at a connection hole, which is formed in the outer peripheral portion of the bottom wall 90 of the case member 86, while extending downward therefrom and being bent at its medium part so as to protrude sideward. This connector 122 is provided with a connector terminal fitting 124, for which one end is in conductive contact with the coil terminal fitting 84, while the other end is exposed to the outside. The coils 74, 74 are supplied with power from a not-shown power supply device connected to the connector 122, thereby each forming a magnetic field to magnetize each of the outer yokes 76, 76. This generates magnetic force between the upper and lower yokes 106, 108 of the movable member 70 and the respective outer yokes 76, 76. Therefore, the movable member 70 is displaced relative to the stator 68 in the axially up-down direction. A not-shown control device switches the direction of the current supplied for the coils 74, 74 from the power supply device at a set timing, thereby controlling the direction of displacement of the movable member 70 relative to the stator 68, i.e. oscillation frequency.

Moreover, the connected-side ends of the coil terminal fitting 84 and the connector terminal fitting 124 both extend in the axis-perpendicular direction, and the ends of the coil terminal fitting 84 and the connector terminal fitting 124 are in planar contact with each other. This permits deviation in relative position between the coil terminal fitting 84 and the connector terminal fitting 124 in the axis-perpendicular direction. Therefore, even if the stator 68 is displaced relative to the case member 86 in the axis-perpendicular direction owing to the gap 118 for relative alignment with the movable member 70, the connection between the coil terminal fitting 84 and the connector terminal fitting 124 are maintained.

Meanwhile, the case member 86 is attached to the outer caulking fitting 46. Specifically, as for the case member 86, the support piece 92 provided at its upper end opening is inserted between the connection plate 62 of the fastening fitting 60 and the outer peripheral part of the support member 32 in the axial direction. The outside peripheral parts of the connection plate 62 and the support member 32 are fixed by caulking with the caulking piece 50 of the outer caulking fitting 46, so that the support piece 92 is fixed to the outer caulking fitting 46. By so doing, the case member 86 provided with the support piece 92 is attached to the second mounting member 14 via the outer caulking fitting 46. The fastening fitting 60 is configured to be mounted to a not-shown vehicle body as described later, and thus the case member 86 will be supported on the side of the vehicle body.

In the present embodiment, there is provided a gap between the peripheral wall 88 of the case member 86 and the support member 32 as well. Owing to this gap, when the fastening fitting 60 is fixed by caulking to the outer caulking fitting 46, even in the case where, for example, the fastening fitting 60 hits the caulking piece 50 due to deformation or the like of the caulking piece 50 during the caulking process and displaces in the axis-perpendicular direction, it is possible to prevent the case member 86 from displacing integrally with the fastening fitting 60, thereby keeping the case member 86 positioned with respect to the movable member 70. In particular, in the structure in which the case member 86 and the stator 68 are positioned and fixed before the case member 86 and the fastening fitting 60 are fixed to each other by the outer caulking fitting 46, by providing a gap between the peripheral wall 88 of the case member 86 and the fastening fitting 60 so as to prevent the case member 86 from displacing together with the fastening fitting 60, it is possible to avoid displacement of the stator 68 relative to the movable member 70 after alignment. Besides, the case member 86 can be made light since the rigidity or strength required therefor is lower than that for the fastening fitting 60. Thus, in comparison with the case where the axis of the case member 86 is aligned with that of the movable member 70 together with the large, heavy fastening fitting 60, axis alignment will also be performed with higher accuracy and easiness.

For the engine mount 11 of this structure, the first mounting member 12 is mounted, via a not-shown inner bracket fixed to the attachment piece 18 with a bolt, on a power unit that is not shown either, while the second mounting member 14 is mounted via the fastening fitting 60 on the not-shown vehicle body. Consequently, the engine mount 11 is interposed between the power unit and the vehicle body, so that the power unit is supported by the vehicle body in a vibration-damping manner. Note that since the relative positional relationship between the fastening position of the first mounting member 12 to the power unit and the fastening position of the attachment plate 64 of the fastening fitting 60 to the vehicle body has been predetermined on the vehicle side, the fastening fitting 60 is positioned in a prescribed position relative to the first mounting member 12.

Upon input of a low-frequency, large-amplitude vibration corresponding to engine shake, internal pressure fluctuation is induced in the primary liquid chamber 36. Relative pressure difference between the primary liquid chamber 36 and the auxiliary liquid chamber 52 causes a fluid flow between the both chambers 36, 52 through the orifice passage 58. This exerts vibration-damping effect on the basis of flow action like fluid resonance action.

Upon input of a medium- to high-frequency, small-amplitude vibration such as idling vibration (about some dozen Hz) or driving rumble (about 30 Hz to 200 Hz), for example, the orifice passage 58 is substantially closed by antiresonance. Meanwhile, the output member 34 constituting a part of the wall of the primary liquid chamber 36 is oscillated by the vibration-damping electromagnetic actuator 10 in the axial direction, thereby applying the oscillation force to the primary liquid chamber 36. As a result, the actively applied oscillation force cancels the input vibration, thereby yielding the target vibration-damping effect. In the present embodiment, the oscillation force is applied to the primary liquid chamber 36 through the filter orifices 40, thereby exhibiting active vibration-damping effect owing to the oscillation more effectively.

With the engine mount 11 constructed according to the present embodiment, in the vibration-damping electromagnetic actuator 10 that applies oscillation force to the primary liquid chamber 36, there is provided the gap 118 between the opposed faces of the coil members 72, 72 that constitute the stator 68 and the peripheral wall 88 of the case member 86 in the axis-perpendicular direction. By so doing, displacement of the stator 68 relative to the case member 86 is permitted in the axis-perpendicular direction, so that the stator 68 housed in the case member 86 can be aligned with the movable member 70 elastically positioned with respect to the case member 86. As a result, even if there is variability in relative positions of the output member 34 and the case member 86 in the axis-perpendicular direction, for example, the movable member 70 connected to the output member 34 will be coaxially aligned with the stator 68, thereby obtaining desired output effectively.

Moreover, for the stator 68 aligned with the movable member 70, the coil members 72, 72 are clasped between the bottom wall 90 of the case member 86 and the support member 32 in the axial direction. Thus, the stator 68 is fixed to the case member 86 and prevented from relative displacement in the axis-perpendicular direction. Therefore, after the alignment of the stator 68 with respect to the movable member 70, displacement of the stator 68 relative to the movable member 70 in the axis-perpendicular direction will be limited, thereby keeping the stator 68 and the movable member 70 aligned with each other in the axis-perpendicular direction. This makes it possible to exhibit the desired output with stability, as well as to prevent the stator 68 from moving with respect to the case member 86 so as to avoid noises or damages to the components. In particular, since the stator 68 is clasped and positioned between the case member 86 and the support member 32 in the axial direction, by attaching the support member 32 and the case member 86 to the outer caulking fitting 46, the stator 68 can be readily fixed to the case member 86.

Furthermore, for the movable member 70, by adjusting the screwing amount of the position adjustment nut 116 relative to the male thread portion 35 of the output member 34, the attachment position of the movable member 70 with respect to the output member 34 can be adjusted in the axial direction, whereby the movable member 70 is aligned with the stator 68 in a prescribed axial position. Therefore, even if there is variability in relative positions of the output member 34 and the case member 86 in the axial direction, for example, the movable member 70 connected to the output member 34 will be aligned with the stator 68 in the direction of oscillating displacement, thereby obtaining desired output effectively.

Since the alignment of the stator 68 and the movable member 70 with each other is possible as described above, in the engine mount 11, desired active oscillation force will be effectively applied to the primary liquid chamber 36, whereby canceling vibration-damping effect against input vibration can be advantageously attained. Moreover, excessive contact of the stator 68 with the movable member 70 due to axial deviation therebetween will be avoided, thereby realizing improvement in durability, prevention of sticking, or the like.

An embodiment of the present invention has been described in detail above, but the present invention is not limited to those specific descriptions. For example, the preceding embodiment illustrated the structure wherein the gap 118 is formed between the coil members 72, 72 and the case member 86 so as to permit the stator 68 to undergo displacement relative to the case member 86 in the axis-perpendicular direction. However, the structure for permitting relative displacement between the stator 68 and the housing is not limited to the specific structure described in the embodiment. As a specific example, it would also be acceptable that a gap is provided between opposed faces of the outer peripheral surface of the case member 86 and the inner peripheral surface of the fastening fitting 60 so as to permit the case member 86 to undergo displacement relative to the fastening fitting 60 in the axis-perpendicular direction, thereby permitting displacement of the stator 68 relative to the fastening fitting 60 in the axis-perpendicular direction. This will enable the stator 68 to be aligned with the movable member 70. That is, it would also be possible to employ the structure wherein the fastening fitting 60 is considered as the housing, and the alignment of the stator 68 and the movable member 70 is made possible by relative displacement between the stator 68 and the fastening fitting 60. Note that it would also be acceptable that the gap between the case member 86 and the fastening fitting 60 as mentioned above, and the gap 118 between the coil member 72, 72 and the case member 86 are both provided so as to permit relative displacement between the stator 68 and the housing in the axis-perpendicular direction.

Besides, the fixing means that positions and fixes the stator 68 with respect to the case member 86 after the stator 68 is aligned with the movable member 70 is not necessarily limited to the structure in which the coil members 72, 72 are clasped between the support member 32 and the bottom wall 90 of the case member 86 in the axial direction. As a specific example, it would also be acceptable that the coil members 72, 72 are clasped in the axial direction between other components supported by the support member 32 or the case member 86, or it would also be acceptable that the stator 68 and the case member 86 are positioned by inserting a different component into the gap 118. Note that the fixing means is not essential to the present invention, and the stator 68 may be attached to the case member 86 displaceably relative to the case member 86.

The vibration-damping electromagnetic actuator 10 according to this invention can be used for an active fluid-filled vibration-damping device as shown in the aforesaid embodiment. In addition to that, this actuator is preferably used as well for an active vibration-damping device shown in Japanese Unexamined Patent Publication No. JP-A-2013-

060963 and other documents, for example. Specifically, for the vibration-damping electromagnetic actuator 10 according to this invention adopted for the active vibration-damping device, the output member 34 attached to the movable member 70 and the case member 86 attached to the stator 68 are elastically connected to each other by the support rubber elastic body 30. The stator 68 and the movable member 70 are thus elastically connected to each other indirectly by the support rubber elastic body 30. The stator 68 is attached to a member subject to vibration-damping such as the vehicle body via the case member 86, whereby the oscillation force generated through energization to the coil 74 is applied to the member subject to vibration-damping via the case member 86. Consequently, the active oscillation force reduces the vibration input upon the member subject to vibration-damping in an offset fashion.

Moreover, the specific structures of the stator 68 and the movable member 70 shown in the above-mentioned embodiment are just examples, which provide no structural limitation regarding the stator and the movable member. For example, the structure disclosed in Japanese Patent No. JP-B-4186217, and other structures can be adopted. Furthermore, it is possible to use a structure wherein the coil member constitutes the movable member, while the armature constitutes the stator.

What is claimed is:

1. A vibration-damping electromagnetic actuator comprising:
   a tubular stator;
   a movable member displaceable relative to the stator in an axial direction, and being inserted in the stator;
   a housing including a tubular peripheral wall and being attached to the stator;
   a support rubber elastic body elastically connecting the movable member to the housing;
   a coil member with a coil generating a magnetic field through energization, which is disposed at one of the stator and the movable member; and
   an armature displaceable relative to the coil member by an effect of the magnetic field generated by the coil, which is disposed at an other one of the stator and the movable member, wherein
   the stator is arranged in an inner periphery of the peripheral wall,
   a gap is provided between the peripheral wall and the stator in an axis-perpendicular direction, the gap extending along an entire axial length of the stator,
   the stator is attached to the housing in a state aligned with the movable member, with a position of the stator being adjusted relative to the housing in the axis-perpendicular direction by the gap,
   the housing has a bottomed cup shape with a bottom wall,
   a support member is secured to the support rubber elastic body,
   the support member is fixed to the housing, and
   the stator aligned with the movable member in the axis-perpendicular direction is clasped between the bottom wall of the housing and the support member in the axial direction so as to be fixed to the housing non-displaceably relative to the housing in the axis-perpendicular direction.

2. The vibration-damping electromagnetic actuator according to claim 1, wherein an output member secured to the support rubber elastic body is inserted in the movable member, and a position adjustment member is provided so as to enable adjustment of an axial position of the movable member with respect to the output member.

3. An active fluid-filled vibration-damping device comprising:
   a first mounting member;
   a second mounting member;
   a main rubber elastic body elastically connecting the first mounting member and the second mounting member to each other;
   a fluid chamber whose wall is partially constituted by the main rubber elastic body with a non-compressible fluid sealed therein;
   an oscillation member constituting another part of the wall of the fluid chamber; and
   the vibration-damping electromagnetic actuator according to claim 1 being attached to the oscillation member via the movable member of the vibration-damping electromagnetic actuator so that oscillation force generated by the vibration-damping electromagnetic actuator is applied to the fluid chamber through the oscillation member.

4. An active vibration-damping device comprising the vibration-damping electromagnetic actuator according to claim 1, wherein
   the housing is configured to be attached to a member subject to vibration damping, and
   the stator and the movable member are elastically connected to each other by the support rubber elastic body.

5. A manufacturing method of the vibration-damping electromagnetic actuator comprising:
   a tubular stator;
   a movable member displaceable relative to the stator in an axial direction, and being inserted in the stator;
   a housing including a tubular peripheral wall and being attached to the stator;
   a support rubber elastic body elastically connecting the movable member to the housing;
   a coil member with a coil generating a magnetic field through energization, which is disposed at one of the stator and the movable member; and
   an armature displaceable relative to the coil member by an effect of the magnetic field generated by the coil, which is disposed at an other one of the stator and the movable member, wherein
   the stator is arranged in an inner periphery of the peripheral wall,
   a gap is provided between the peripheral wall and the stator in an axis-perpendicular direction, the gap extending along an entire axial length of the stator,
   the stator is attached to the housing in a state aligned with the movable member, with a position of the stator being adjusted relative to the housing in the axis-perpendicular direction by the gap,
   the housing has a bottomed cup shape with a bottom wall,
   a support member is secured to the support rubber elastic body,
   the support member is fixed to the housing, and
   the stator aligned with the movable member in the axis-perpendicular direction is clasped between the bottom wall of the housing and the support member in the axial direction so as to be fixed to the housing non-displaceably relative to the housing in the axis-perpendicular direction,
   the method comprising:
   an alignment step of arranging the stator in the inner periphery of the peripheral wall of the housing and aligning the stator with the movable member in the axis-perpendicular direction; and a fixing step of fixing the stator aligned with the movable member in the axis-perpendicular direction to the housing non-displaceably relative to the housing in the axis-perpendicular direction.

\* \* \* \* \*